United States Patent

[11] 3,555,177

[72] Inventor Tommy N. Tyler
Littleton, Colo.

[21] Appl. No. 650,739
[22] Filed July 3, 1967
[45] Patented Jan. 12, 1971
[73] Assignee Honeywell Inc.
Minneapolis, Minn.
a corporation of Delaware

[54] VIDEO RECORDER HAVING AN ADAPTER TO RECEIVE AND MODIFY VIDEO INPUT SIGNALS FOR APPLICATION TO A CATHODE RAY TUBE RECORDING DEVICE
1 Claim, 4 Drawing Figs.

[52] U.S. Cl. 178/6.7, 178/7.4
[51] Int. Cl. H04n 5/86
[50] Field of Search 178/6.7A, 6.7, 7.4, 7.2D, 6LCR

[56] References Cited
UNITED STATES PATENTS

| | | | |
|---|---|---|---|
| 2,928,895 | 3/1960 | Day, Jr. | 178/6.7X |
| 3,333,058 | 7/1967 | Goldmark et al. | 178/6.7X |
| 3,348,229 | 10/1967 | Freas | 178/6.7X |
| 3,354,264 | 11/1967 | Goldmark | 178/6.7X |
| 3,198,881 | 8/1965 | Knocklein | 178/6.7 |
| 3,210,597 | 10/1965 | Siegmund et al. | 315/21 |
| 3,359,365 | 12/1967 | Kihara | 178/6.6X |

*Primary Examiner*—Richard Murray
*Assistant Examiner*—Richard Eckert, Jr.
*Attorneys*—Arthur H. Swanson and Lockwood D. Burton

ABSTRACT: An adapter for recording a video picture upon a light-sensitive recording medium is connected between a video camera and a fiber optics cathode ray tube recording apparatus. The adapter modifies the input signal received from the camera to generate synchronized horizontal and vertical sweep signals and to modulate the intensity of the electron beam, formed by the cathode ray tube, in response to the video signal. The adapter also blanks alternate fields for allowing a continuous series of picture frames to be recorded upon the recording medium passing over the face plate of the fiber optics cathode ray tube.

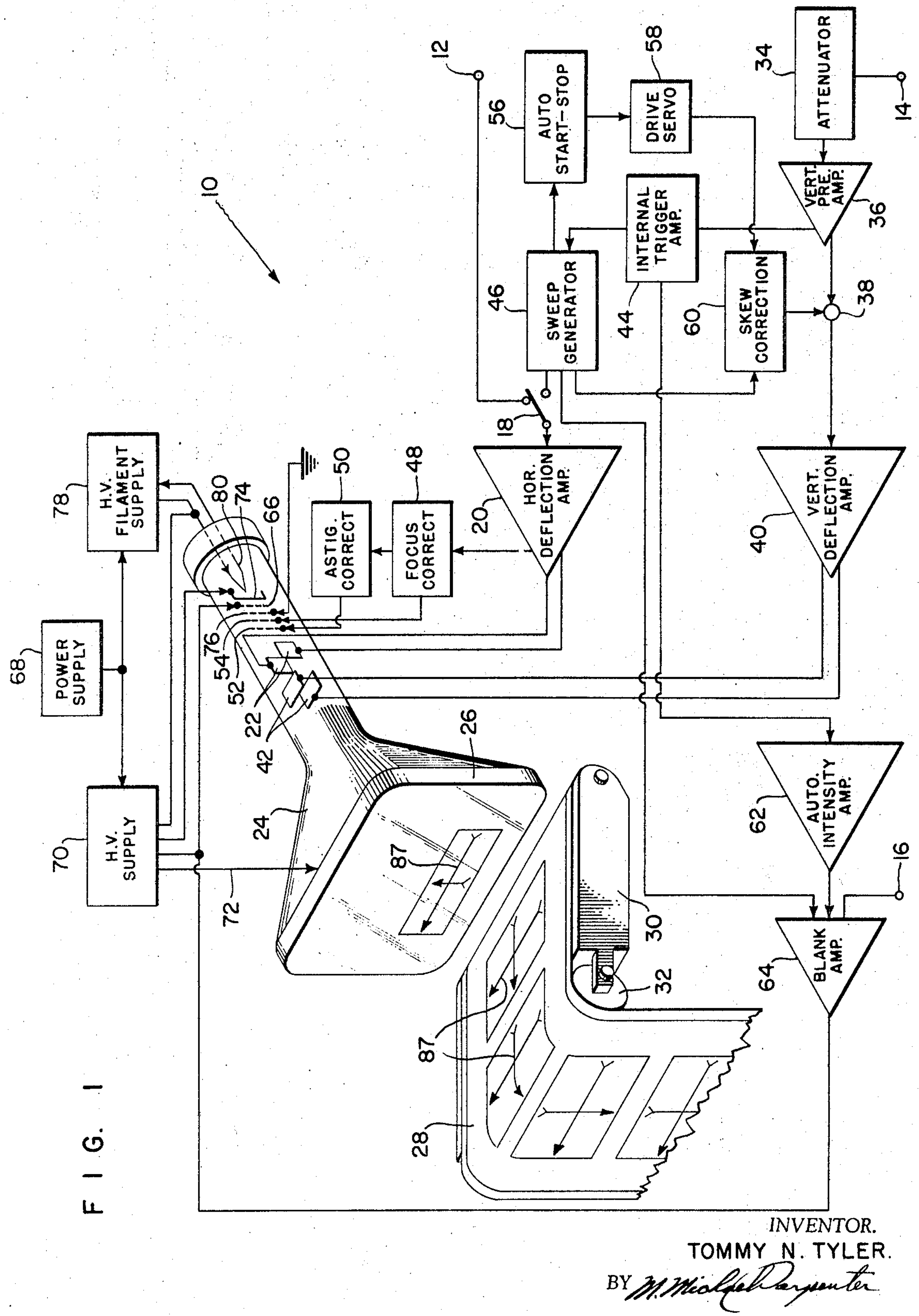
F I G. I
INVENTOR.
TOMMY N. TYLER.
BY M. Michael Carpenter
ATTORNEY.

INVENTOR.
TOMMY N. TYLER.
BY M. Michael Carpenter
ATTORNEY.

VIDEO RECORDER HAVING AN ADAPTER TO RECEIVE AND MODIFY VIDEO INPUT SIGNALS FOR APPLICATION TO A CATHODE RAY TUBE RECORDING DEVICE

The present invention relates to a video recorder and, more particularly, to an adapter which receives input signals from a video camera or video receiver and modifies these signals for application to an oscillographic recording apparatus for printing the signals, in the form of pictures, upon a recording medium.

The transmission of a video signal to a video receiver, such as a television set, is well known in the art. Video recording devices using magnetic tape have been developed to record a television picture upon the tape for playback at a later time. Until the recent introduction of a fiber optics cathode ray tube recording apparatus, however, there was no device capable of continuously producing a permanent, visible record of a high frequency input signal, such as that required to produce television pictures. This recording apparatus utilizes a fiberoptics cathode ray tube for continuously recording and immediately displaying high frequency input signals upon a recording medium associated therewith. The fiber optics cathode ray tube recording apparatus is disclosed in a previously filed patent application Ser. No. 614,448, filed Feb. 7, 1967, by Norman L. Stauffer et al. now U.S. Pat. No. 3,434,158 to the same assignee as the present invention. The present invention provides an adapter which may be utilized with this recording apparatus for providing a permanent display of a television picture upon a light-sensitive recording medium. While the present invention is described in connection with an adapter for recording television pictures, it is also useful in the field of document transmission. That is, the present invention may be utilized for scanning an original document and transmitting its image to a remote receiver which reproduces the document upon a recording medium for immediately displaying a permanent copy thereof.

Accordingly, an object of the present invention is to provide a video recording device for permanently recording video input signals upon a recording medium in the form of an immediately visible display.

Another object of the invention described herein is to provide an adapter which may be used in combination with a fiber optics cathode ray tube recording apparatus for producing a permanent record of a high frequency video input signal as a visual display upon a light sensitive paper.

Still another object of the present invention is to provide a video recording device which will scan a document in one location, transmit the results of that scanning to a remote location, and reproduce the scanned document for providing a permanent copy thereof many miles from the location of the original document.

A further object of this invention provides a video recorder which is capable of modifying an output signal received from a video camera and feeding this signal into a recording apparatus for producing an immediately visible, permanent video picture upon a light-sensitive recording paper.

Other object and many of the attendant advantages of the present invention will become readily apparent to those skilled in the art as a better understanding thereof is obtained by reference to the following description when considered in connection with the accompanying drawings, wherein:

FIG. 1 is a schematic diagram, showing the electrical circuitry of the recording apparatus associated with the present invention;

Figure 4:
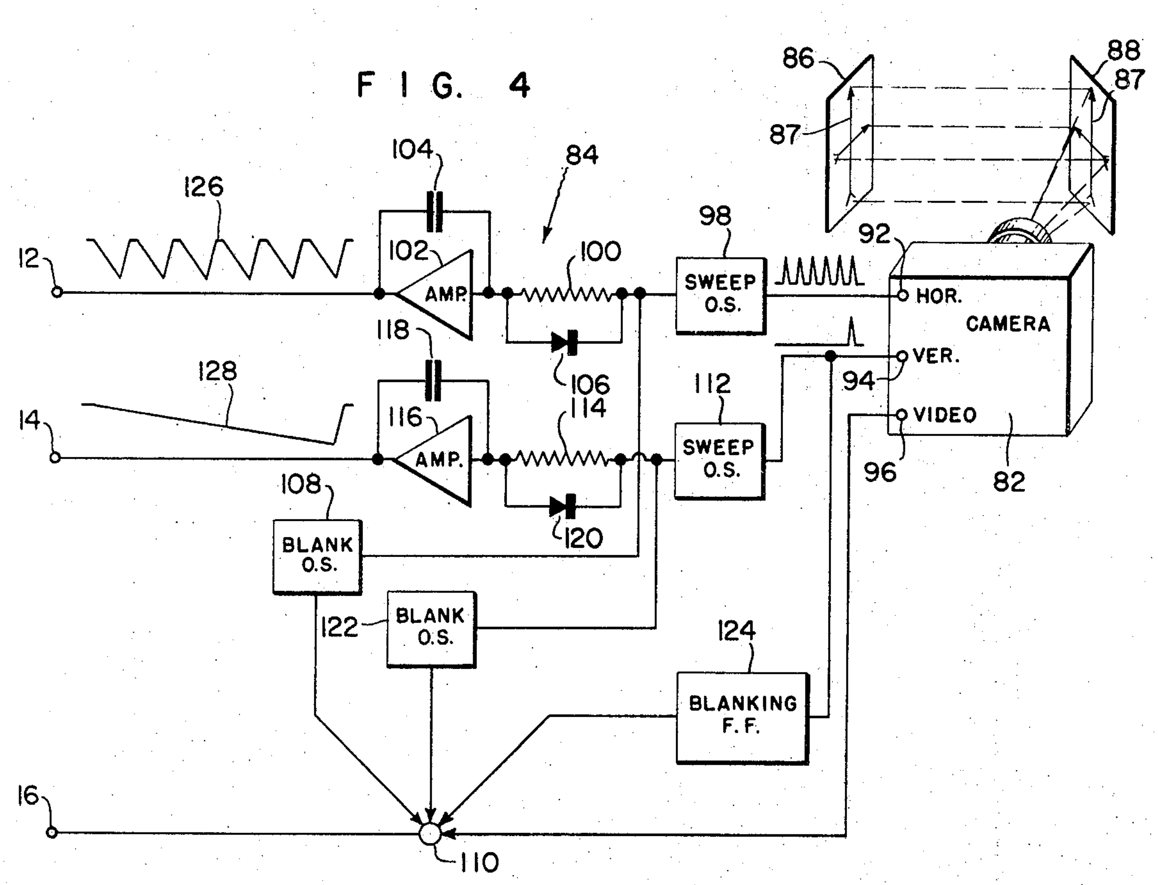
FIG. 4 is a schematic diagram, showing the input circuitry necessary to adapt the recording apparatus of FIG. 1 for recording a video input signal.

The video recorder of the present invention utilizes an adapter for modifying an input signal received from a video camera, such as a signal received from a standard television camera, and then applies this modified input signal to a fiber optics cathode ray tube recording apparatus. The recording apparatus utilizes a fiber optics cathode ray tube for emitting electromagnetic radiation of a predetermined wavelength. A recording medium that is ultrasensitive to the predetermined wavelength is pressed against the face plate of the cathode ray tube by a platen thereby positioning the recording medium for receiving the electromagnetic energy from the cathode ray tube. The upper portion of the platen mounts an idler roller which engages a pressure roller for pinching the recording medium therebetween. The pressure roller is connected through a belting arrangement to a drive motor that provides a driving force for drawing the recording medium continuously over the face plate of the cathode ray tube. An input signal, applied to the fiber optics cathode ray tube through suitable amplifying networks, causes an electron beam generated therein to sweep across the inner surface of the face plate for actuating a phosphor thereon and causing the emission of electromagnetic radiation. This radiation passes through the fiber optic bundles within the face plate and forms a recording trace that strikes the radiation-sensitive surface of the recording medium adjacent thereto for forming a corresponding recorded trace thereon. The electron beam is vertically deflected, as it sweeps horizontally across the face plate, for skewing the recording trace thus formed. The motion of the recording medium offsets this skew for forming a recorded trace transversely upon the recording medium in a normal relationship with the longitudinal motion thereof. A video adapter circuit is provided for connecting a video camera to the input of the fiber optics cathode ray tube recording apparatus. The adapter circuit includes provisions for blanking portions of the horizontal and vertical sweep signals within the fiber optics cathode ray tube recording apparatus. The adapter also provides a means for blanking alternate sets of recording traces or lines which make up the picture produced by the video camera for providing continuous reproduction of pictures upon the recording medium as it drawn across the face plate of the recording apparatus.

Referring now to the drawings, the fiber optics cathode ray tube recording apparatus is shown generally at 10, FIG. 1, having an input terminal 12 for receiving a horizontal deflection input signal, an input signal, and an input terminal 16 for receiving a video input signal. The input terminal 12 is connected through the first position of a single-pole double-throw switch 18 to the input of a horizontal deflection amplifier 20. The output of the amplifier 20 is applied across a pair of horizontal deflection plates 22 within a fiber optics cathode ray tube 24 associated with the recording apparatus. Thus, a horizontal deflection signal applied to the input terminal 12 causes the electron beam generated by the cathode ray tube 24 to sweep transversal across the inner surface of a face plate 26 associated therewith. The face plate 26 consists of millions of tiny transparent fibers, each for example 10 to 15 microns in diameter, embedded within the full surface thereof and arranged at right angles thereto. The inner surface of the face plate 26 is coated with a phosphor whose cathode luminescence causes the release of electromagnetic radiation having a concentration of wavelengths at the point of maximum sensitivity of a recording medium 28. Although many combinations of phosphor and recording medium sensitivity may be utilized, the ultraviolet range has been found to be desirable. In this range, radiation from artificial or natural light has little affect upon the light-sensitive recording medium 28. In the recording apparatus, the recording medium 28 is pressed against the face plate 26 by a platen 30. The platen 30 is shown diagrammatically in an open position in FIG. 1. The recording medium 28 passes over an idler roller 32 attached to the upper portion of the platen 30. In its closed position the platen forces the idler roller 32 against a spring-loaded pressure roller, not shown, for pinching the recording medium 28 therebetween. A driving motor, also not shown, supplies a rotational motion to the pressure roller for causing the recording medium 28 to be drawn across the face plate surface of the fiber optics cathode ray tube 24.

A vertical deflection input signal is introduced to the fiber optics cathode ray tube recording apparatus from the input terminal 14 through an attenuator circuit 34, and then into a vertical preamplifier 36. From the preamplifier the signal is applied through a summing junction 38 to a vertical deflection amplifier 40. The output of the vertical deflection amplifier 40 is utilized to provide the potential between a pair of vertical deflection plates 42 within the fiber optics cathode ray tube 24. The input signal from the vertical preamplifier 36 is also introduced into an internal trigger amplifier 44 and then applied to a sweep generator 46. The trigger amplifier 44, in combination with the sweep generator 46, provides a signal to the horizontal deflection amplifier 20 when the switch 18 is in its second position. A second output from the horizontal deflection amplifier 20 is serially connected with a focus correction circuitry 48 and an astigmatism correction circuitry 50. These circuits, in turn, are respectively connected to separate control grids 54 and 52 withing the fiber optics cathode ray tube 24.

The sweep generator circuit 46 provides a signal to an automatic start-stop circuit 56 that connects to a drive servo circuitry 58 for controlling the speed of the recording medium 28 as it is drawn across the face plate 26. In the energized state, an input signal, applied to the input terminal 14, causes the sweep generator 46 to produce a corresponding signal for application to the automatic start-stop circuitry 56. This signal energizes the drive servo circuitry 58 for starting the drive motor, not shown, and drawing the recording medium 28 past the face plate of fiber optics cathode ray tube 24. As the drive servo circuitry is energized, the output therefrom is applied to a skew correction circuitry 60 which connects to the summing junction action 38. The circuitry thus applies a current to the summing junction for correcting the input signal applied to the vertical deflection amplifier 40. In this manner, the input signal is offset upon the face plate of the fiber optics cathode ray tube 24 in direct proportion to the speed at which the recording medium is drawn thereby. Through this combination, the recording medium may be accelerated and decelerated by the automatic start-stop circuitry 56 while the drive servocircuitry 58 and the skew correction circuitry 60 the recorded trace in a normal relationship to the longitudinal motion of the recording medium.

The internal trigger amplifier 44 also applies the vertical deflection input signals received thereby to an automatic intensity amplifier 62. The automatic intensity amplifier 62 increases the electron beam current in direct proportion to the changing potential caused by the vertical deflection input signals received at terminal 14. In this manner, the recording trace intensity is not maintained at a constant level upon the surface of the face plate 26 but is increased in direct proportion to the increase in beam velocity due to its vertical deflection. The sweep generator 46 provides an output signal to a blanking amplifier 64. The output of the automatic intensity amplifier 62 is also connected to the input of the blanking amplifier 64, while the output thereof is applied to a control grid 66 within the fiber optics cathode ray tube 24. The output of the automatic intensity amplifier and the cathode ray tube itself is thus blanked during flyback, when the electron beam is returned to its starting position by the horizontal deflection amplifier.

A power supply 68 is connected to a high voltage supply 70 which provides a positive potential, for example +5000 volts DC, to the anode 72 of the fiber optics cathode ray tube 24. The power supply also provides a negative potential, for example −2,500 volts DC, to the cathode 74 thereof. The high voltage supply 70 is connected to the control grid 66 which is controlled by the blanking amplifier 64. A fourth control grid 76 is connected to a reference potential, such as ground. The power supply 68 connects to a high voltage filament supply 78 for providing power to the heater element 80 within the cathode ray tube.

The adapter which comprises the video recording adapter is shown in FIG. 4. A video camera 82 is provided for scanning an image and transforming that image into an electromagnetic output signal. The video camera may be one of several standard television cameras presently available. The adapter, shown generally at 84 in FIG. 4, is connected between the video camera 82 and the recording apparatus 10 for modifying the signal received from the camera and applying this signal to the recording apparatus. When a video camera is being utilized to scan a document 86, the image 87 may be transmitted toward the camera by reflection from a mirror 88. The mirror 88 may be utilized to provide the proper image 87 on the face plate 26 of the fiber optics cathode ray tube 24. The inverted image is thus returned to its proper orientation when placed upon the recording medium 28, FIG. 1. The correction may also be cone electrically within the fiber optics cathode ray tube recording apparatus 10. These arrangements allow an original document to be viewed by a video camera and transmitted from the point of viewing to a remote point for reproduction in the form of a permanent copy of the original.

The present invention utilizes a standard video or television camera for converting an image into an electromagnetic output signal. However, the standard television picture frame is reproduced one line at a time by interfacing two fields or sets of horizontal lines. The first field or set contains 263 lines requiring one-sixtieth of a second to display. The second field or set of 262 lines is recorded by jumping back to the beginning and filling in between the first set of lines in an interlaced arrangement. When recording a television frame on the moving recording medium 28, the standard format will not provide a proper recording since the first field of recorded lines will have moved away from the face plate 26 before the second field is displayed thereon. One solution of this problem is to record only the first field of 263 lines per frame while blanking the second field of 262 lines. This may be done with some sacrifice of detail and resolution. On a recording medium which is 6 inches wide, if the width of the video frame were established at 5 inches the height should be approximately 4 inches. Since each frame is generated in one-sixtieth of a second, the speed of the recording medium 28 would have to be 240 inches per second to obtain a 4-inch by 5-inch frame.

Figure 2:
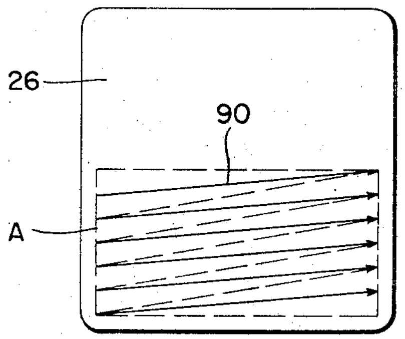
FIG. 2 is a diagrammatic illustration of a recording trace formed upon the face plate of a fiber optics cathode ray tube used within the recording apparatus.
Figure 3:
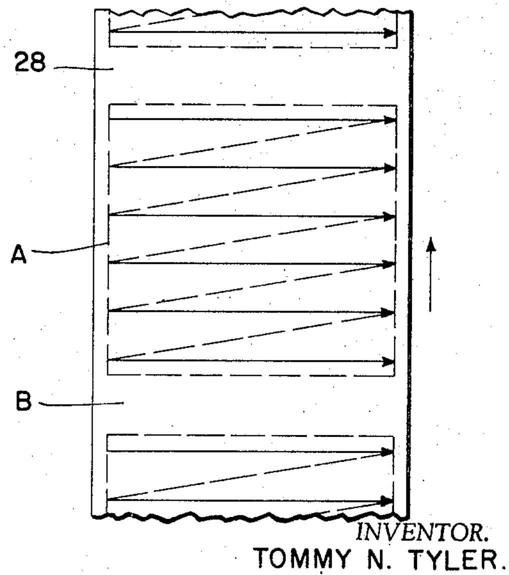
FIG. 3 is a diagrammatic illustration of the recorded trace formed upon the recording medium that passes over the face plate of the recording apparatus.

The video recording adapter 84 couples the vertical deflection input signal from the television camera 82 to the recording apparatus 10 and generates the 4-inch vertical height of the frame through the combination of recording medium speed and vertical deflection of the electron beam within the fiber optics cathode ray tube 24. Through this arrangement the 4-inch by 5-inch frame may be recorded at a paper speed of 120 inches per second while the difference in speed is made up by the vertical deflection of the cathode ray tube. The second field of interlacing lines is then blanked out by the video recording adapter. This arrangement is shown schematically in FIGS. 2 and 3. FIG. 2 shows the face plate 26 of the cathode ray tube 24 wherein the recording trace 90 is displaced horizontally across the surface of the face plate 26, from left to right, and skewed upwardly as it crosses. The skew correction compensates for the motion of the recording medium. After each sweep, the recording trace is displaced downwardly before its next sweep. The recording trace thus sweeps across the face plate 263 times for forming a first field A thereon. As illustrated in FIG. 2, the height of the field A on the face plate 26 is one-half the desired height of the final reproduced image. The recording medium 28 is drawn across the face plate 26 at a speed substantially equal to the downward displacement of the recording tract 90. The combined motion of the recording medium 28 and the downward displacement of the recording trace 90 produces a field picture A upon the recording medium 28, stretched to the desired 4-inch by 5-inch dimension. If a standard television format were used, the second field of lines would then sweep across the face plate 26 between the recording traces 90 forming the first field thereon. As last recording trace 90 forming the first field has been directed downwardly toward the lower portion of the face plate 26, and the recording medium 28 is moving upwardly across this surface, the attempted recording of the second field of interlaced lines would cause an incorrect alignment of the two fields. Therefore, the second field is blanked out within the present invention. While the second field is blanked out, the recording medium 28 is moving to the starting point of the next field A. This allows the lower portion of the previously produced field A to move away from the starting point of the next field and allows the compression of the second field to form a small adjustable space B between consecutive recorded fields.

Referring once again to FIG. 4, the circuitry which provides the program described hereinabove is shown. The video camera is shown having horizontal vertical, and video output signal terminals 92, 94, 96, respectively. The horizontal output signal terminal 92 is connected to a sweep gating one-shot 98 having an output terminal which connects through a resistor 100 to the input of an amplifier 102. The output of the amplifier 102 is connected to the horizontal deflection input signal terminal 12. A capacitor 104 connects from the output of the amplifier 102 to the input thereof for forming a feedback network. A diode 106 is connected across the resistor 100 with its anode directed toward the input of the amplifier 102. The output of the sweep gating one-shot 98 is also connected to a differentiator 108 which is constructed in the form of a blanking one-shot differentiator. The output of the differentiator 108 connects to a summing junction 110. In a similar manner, the vertical output signal terminal 94 connects to a signal gating one-shot 112 whose output connects through a resistor 114 to the input of an amplifier 116. The output of the amplifier 116 connects to the vertical deflection input signal terminal 14. A capacitor 118 connects across the amplifier 116 to provide a feedback circuit therefore. A diode 120 connects across the resistor 114 with the anode thereof directed toward the input of the amplifier. The output of the sweep gating one-shot 112 is connected to a second differentiator 122 having an output which connects to the summing junction 110. The vertical output signal terminal 94 of the video camera 82 also connects to the input of a blanking flip-flop 124 having an output connected to the summing junction 110. The video output signal terminal 96 also connects to the summing junction 110. The summing junction then connects to the input signal terminal 16 of the recording apparatus 10.

In operation, pulsed input signals are received from the horizontal and vertical output signal terminals, 92 and 94, while the video output signal is received from the video input terminal 96. Each horizontal input pulse passes through the horizontal circuitry of the adapter 84 and is shaped into the waveform shown schematically at 126. The slope of the negative going ramp is determined by the R/C circuit comprising the resistor 100 and capacitor 104, while the positive ramp slope is determined by the R/C circuit formed by the capacitor 104 and internal resistance of diode 106. For every 262.5 pulses received by the horizontal circuitry, one input pulse is received by the vertical circuitry. This pulse is shaped in the same manner as the horizontal pulses with the values of the resistor 114 and capacitor 118 accounting for the difference of the waveform, illustrated at 128. The output from the sweep gating one-shot 98 is applied to the differentiator 108 for generating a blanking signal at the summing junction 110 during the flyback of the horizontal sweep pulse. In a similar manner, the sweep gating one-shot 112 also provides a blanking signal from differentiator 122 to the summing junction 110 during the flyback of the vertical sweep signal. The blanking flip-flop 124 is arranged for providing a blanking signal to the summing junction 110 during alternate pulses from the vertical output signal terminal 94. The video signal is continuously applied through the summing junction 110 to the blanking amplifier 64 of the recording apparatus 10. Each blanking signal from the blanking one-shot differentiators, 108 and 122, and the blanking flip-flop 124 provides a blanking signal at the summing junction 110. This signal is then applied to the blanking amplifier 64 within the recording apparatus 10 for saturating the amplifier. As the blanking amplifier 64 saturates, it drives the grid 66 of the fiber optics cathode ray tube 24 in a negative direction and disables the cathode ray tube from detecting the continuous video signal received thereby. Through this arrangement the alternate fields of each frame and the flyback traces of the vertical and horizontal signals are prevented from being recorded.

From the description hereinabove, it can be seen that the present invention may be utilized to provide an immediate and permanent display of a video transmission of high frequency input signals for forming a television picture frame or the reproduction of a document viewed by a video camera. When a document is being reproduced, it might be desirable to increase the detail and resolution of the image which is displayed upon the face plate 26 of the fiber optics cathode ray tube 24. This can be achieved by stopping the motion of the recording medium 28 and disabling the blanking flip-flop 124. The R/C circuit, formed by resistor 114 and capacitor 118 of the vertical signal circuitry may then be adjusted to return the image upon the face plate to its normal 4-inch height. It is also possible to retain the higher detail and resolution of the image while the recording medium is moving. This is achieved by further adjustment of the R/C circuit, 114 and 118, within the vertical signal circuitry of the video adapter 84. In this arrangement, the downward deflection of the vertical circuitry must equal the motion of the recording medium 28. The first field of lines is started at the center of the face plate 26 and displaced downwardly to the lower portion thereof. As this downward displacement is equal to the speed of the recording medium, the first recorded line on the medium is at the top of the face plate 26 when the last line of the field is recorded upon the medium at the bottom of the face plate. The vertical circuitry now displaces the electron beam to the top of the face plate, just below the first recorded line of the first field, and the second field of lines is recorded upon the medium as it moves across the face plate. The last line of the second field is displaced downwardly to the center of the face plate and produces a recorded trace upon the medium just below the last line of the first field which has moved up to the center of the face plate. The circuitry for achieving this arrangement remains substantially the same as that shown in FIG. 4. The length of the shaped wave form 128 is extended to cover two fields of lines (generated by waveform 126) and its amplitude is increased and arranged so that the low point thereof is reached at the end of the first field of lines. This arrangement thus eliminates the ability of the present invention to provide an adjustable space B between the continuously recorded frames as the frames formed by the first and second fields are now interlaced. The blanking flip-flop 124 is also disabled in this arrangement. The mirror 88 may be used to insure legibility of the document after it has been permanently recorded upon the recording medium 28.

Obviously, many modifications and variations of the present invention will become apparent to those skilled in the art in light of the above teachings and it should therefore be understood that the embodiments described hereinabove are illustrations rather than limitations of the scope of the present invention. Consequently, the present invention should be limited only by the appended claims.

The embodiment of the invention in which an exclusive property or privilege is claimed are defined as follows:

I claim:

1. A video recorder for producing an immediate display of an image comprising:

video means for scanning said image and converting said image into a series of input signals including video input signals and horizontal and vertical synchronizing pulse signals;

video adapter means for receiving and modifying said series of input signals including a summing junction, first pulse amplifying means for receiving said horizontal synchronizing pulse signals, second pulse amplifying means for receiving said vertical synchronizing pulse signals, and blanking means;

means connecting output means of said first pulse amplifying means, output means of said second pulse amplifying means, video output means of said video means and output means of said blanking means to said summing junction;

recording apparatus means arranged to receive said modified series of input signals including a cathode ray tube means, means connecting an output of said summing junction to said cathode ray tube means, means connecting output means of said first and second pulse amplifying means to said cathode ray tube means, having a face plate upon which said modified series of input signals is displayed;

means connecting input means of said blanking means to said video means for receiving vertical synchronizing pulse signals, said blanking means producing an output signal for every alternate vertical synchronizing pulse signal, said output signal of said blanking means blanking said cathode ray tube means;

a recording medium passing over said face plate of said cathode ray tube said recording medium being responsive to said modified series of input signals displayed upon said face plate for recording said displayed image thereon;

said pulse amplifying means including gating means respectively connected to receive said horizontal and vertical synchronizing pulse signals;

resistance means;

amplifier means having inputs connected through said resistance means to said gating means and outputs respectively connected to said recording apparatus capacitor means connected between said inputs and outputs of said amplifier means; and diode means connected across said resistance means, whereby said received horizontal and vertical synchronizing pulses are modified the final period to make the claim more clear, said output means of said first and second pulse amplifying means connected to the summing junction being the outputs of the gating means.